(12) United States Patent
Vaupel (10) Patent No.: US 7,752,415 B2
(45) Date of Patent: Jul. 6, 2010

(54) METHOD FOR CONTROLLING THE CAPACITY USAGE OF A LOGICALLY PARTITIONED DATA PROCESSING SYSTEM

(75) Inventor: Robert Vaupel, Weingartenstr (DE)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 11/314,899

(22) Filed: Dec. 21, 2005

(65) Prior Publication Data

US 2006/0136695 A1    Jun. 22, 2006

(30) Foreign Application Priority Data

Dec. 22, 2004    (EP)    ................... 04106906

(51) Int. Cl.
G06F 12/00    (2006.01)
G06F 9/46    (2006.01)

(52) U.S. Cl. ...................... 711/173; 718/104

(58) Field of Classification Search ........................ None
See application file for complete search history.

(56) References Cited

U.S. PATENT DOCUMENTS

| 6,282,560 | B1 * | 8/2001 | Eilert et al. ................. 718/100 |
| 6,438,704 | B1 * | 8/2002 | Harris et al. ................ 713/502 |
| 7,007,276 | B1 * | 2/2006 | Kubala et al. ............... 718/104 |
| 7,051,188 | B1 * | 5/2006 | Kubala et al. ................ 712/29 |
| 7,096,469 | B1 * | 8/2006 | Kubala et al. ............... 718/100 |
| 2008/0034366 | A1 * | 2/2008 | Tanaka et al. ................. 718/1 |

* cited by examiner

Primary Examiner—Sheng-Jen Tsai
Assistant Examiner—Kaushikkumar Patel
(74) Attorney, Agent, or Firm—Cantor Colburn LLP; William Kinnaman, Jr.

(57) ABSTRACT

The present invention provides a new method and a new system for controlling the capacity usage of a logically partitioned data processing system comprising physical data processing resources that are divided into multiple logical partitions, wherein the capacity of the logical partitions is monitored to control the consumption of the physical data processing resources. The new method and the system are characterized in that at least one group of logical partitions is defined that is managed towards a common capacity group limit.

14 Claims, 8 Drawing Sheets

METHOD FOR CONTROLLING THE CAPACITY USAGE OF A LOGICALLY PARTITIONED DATA PROCESSING SYSTEM

CROSS-REFERENCE TO RELATED APPLICATIONS

This application claims the priority benefit, under 35 U.S.C. §119, of European patent application 04106906.3, filed Dec. 22, 2004, and incorporated herein by reference.

BACKGROUND OF THE INVENTION

1. Field of the Invention

The present invention relates to a method and a system for controlling the capacity usage of a logically partitioned data processing system comprising physical data processing resources that are divided into multiple logical partitions, wherein the capacity of the logical partitions is monitored to control the consumption of the physical data processing resources.

2. Description of the Related Art

Capacity management enables information technology (IT) centers of companies to control the cost of their computing environment. In modem computing environments this is an autonomic function. Large computing systems allow installations to divide the physical processing resources into multiple logical computer systems. Methods have been developed to control the resource consumption of these logical computer systems thus enabling an installation to obtain a cost control mechanism for its infrastructure.

Currently it is possible to limit the CPU consumption of a single logical partition. If an installation uses the technique to limit the consumption of multiple partitions running on the same physical computer environment they can only control the CPU consumption for each logical partition individually. The disadvantage is that one logical partition might get capped because it exceeds its defined capacity limit while other logical partitions do not use their defined capacity. This can cause limitations to the work running on the capped partition while other partitions have plenty of unused capacity.

SUMMARY OF THE INVENTION

Starting from this, an object of the present invention is to provide a method and a system for controlling the capacity usage of a logically partitioned data processing system comprising physical data processing resources that are divided into multiple logical partitions, wherein the capacity of the logical partitions is monitored to control the consumption of the physical data processing resources, with a higher efficiency.

The present invention provides a new method and system for controlling the capacity usage of a logically partitioned data processing system comprising physical data processing resources that are divided into multiple logical partitions, wherein the capacity of the logical partitions is monitored to control the consumption of the physical data processing resources.

The new method and the new system are characterized in that at least one group of logical partitions is defined that is managed towards a common capacity group limit. The invention proposes a method for controlling logical partitions which are grouped together. The new method makes more efficient use of the data processing resources and thus enables better and more efficient cost control in large IT centers. In order to expand the known technologies a method is proposed to control the capacity usage of multiple logical computer systems sharing the same physical computer. The new methodology allows installations to group multiple logical computing systems together and balance their capacity until an overall capacity limit is reached. The new method extends an existing technology which allows an installation to control the capacity usage of a single logical computer system.

A preferred embodiment of the method is characterized in that the common capacity group limit is calculated as the sum of the individual capacity limits of all partitions of the group. Preferably, the calculation of the capacity group limit takes place after all partitions of the group have been identified.

A further preferred embodiment of the method is characterized in that the common capacity group limit is calculated as a separate value for all logical partitions forming the group. A group is defined by a group name and a group capacity limit. The individual limit for each partition, which is required to define the point where each individual logical partition gets capped and also to define how much CPU consumption each logical partition is allowed to consume, is defined by the weight of the logical partition of the physical processor or system.

A further preferred embodiment of the method is characterized in that the capacity consumed by the physical data processing resources of all partitions in the same group is collected. The relevant data is obtained for all partitions in the group.

A further preferred embodiment of the method is characterized in that it checks whether the partitions of the group exceed their individual defined capacity limits and if not it checks whether it can be expected that a partition will exceed its individual capacity limit.

A further preferred embodiment of the method is characterized in that if either of these two decision points shows a true result it evaluates how the logical partition's share of the available unused capacity can be adjusted. Otherwise nothing is performed in this data evaluation period.

A further preferred embodiment of the method is characterized in that the calculation whether the partition will potentially exceed its individual capacity limit is calculated by assessing the change in CPU consumption and adding this change to the latest collected CPU consumption.

A further preferred embodiment of the method is characterized in that the share of the unused capacity of the partition is calculated.

A further preferred embodiment of the method is characterized in that the total unused capacity is calculated for all partitions of a group as the sum of the CPU capacities to which the partitions of the group are entitled but which are not used by the partitions. For partitions which exceed their current capacity limit this value is set to zero.

A further preferred embodiment of the method is characterized in that the share of the unused capacity for all partitions which exceed their individual capacity and which have been assessed to exceed their individual limits is calculated. Then it is possible to calculate the CPU capacity which each partition which needs more capacity is entitled to get from the unused capacity.

A further preferred embodiment of the method is characterized in that the maximum increase in capacity for all partitions of a group during a summation interval is calculated. It is independent from the partitions and depends only on the capacity and the number of summation intervals.

A further preferred embodiment of the method is characterized in that it is checked whether a partition exceeds its entitled share of the unused capacity or whether it can be expected that it will exceed the share in the next interval. If yes the next question is whether unused capacity is available or whether the unused capacity is used by partitions exceeding their individual capacity limits or whether it can be expected that the unused capacity will be used in the next interval. If it can be concluded that unused capacity is still available there is no need to limit the CPU consumption for the partition. Otherwise the next allowed CPU consumption is calculated.

The invention further proposes a System for controlling logical partitions which are groped together. The new system makes more efficient use of the data processing resources and thus enables for better and more efficient cost control in large IT centers.

A preferred embodiment of the system is characterized in that a partition manager is responsible for mapping the logical partitions to the physical data processing resources. The partition manager supports multiple different system control programs meaning that different logical partitions can execute different operating systems at the same time. Preferably the partition manager comprises microcode or firmware running on computer hardware.

A further preferred embodiment of the system is characterized in that the CPU capacity of each logical partition is constantly monitored in order to allow a capacity manager to control the consumption of a logical partition. The monitoring function is part of the partition manager. The location of the capacity manager can vary depending on the computing environment.

A further preferred embodiment of the system is characterized in that the capacity manager communicates with the partition manager about the utilization and consumption of the physical data processing resources. For this reason the capacity manager obtains the actual measurement data from the partition manager and signals back to the partition manager to what extent a logical partition is allowed to consume physical data processing resources. The adjustment whether physical data processing resources can be consumed by a logical partition is executed by the partition manager which either enables logical processors to execute their program instructions on physical processors or not.

A further preferred embodiment of the system is characterized in that the capacity manager comprises part of a system control program running on computer hardware. The capacity manager performs all assessments and only tells the partition manager whether and how the partition it is running must be capped, meaning be restricted in using the CPU.

A further preferred embodiment of the system is characterized in that the capacity manager is a separate user process. The basic behavior remains exactly the same with the only difference that it must be assured that the user process is able to access the partition manager in the same way as the system control program. Also if the system control program contains a workload management function the capacity manager is completely detached from this function.

A further preferred embodiment of the system is characterized in that the capacity manager is part of the partition manager. Again the mechanism remains the same with the exception that the capacity manager in the partition manager now performs the calculation for all partitions in a group at once. The basic notion remains the same.

The present invention relates further to a computer program product stored on a tangible medium readable by a digital computer (such as in the internal memory of such a digital computer or on a similar storage device such as a disk), containing parts of software code to execute the above described method.

BRIEF DESCRIPTION OF THE DRAWINGS

The above, as well as additional objectives, features and advantages of the present invention will be apparent in the following detailed written description.

The novel features of the present invention are set force in the appended claims. The invention itself, however, as well as a preferred mode of use, further objectives, and advantages thereof, will be best understood by reference to the following detailed description of an illustrative embodiment when read in conjunction with the accompanying drawings, wherein:

DETAILED DESCRIPTION OF THE INVENTION

Capacity management enables IT centers of companies to control the cost of their computing environment. In modem computing environments this is an autonomic function. Large computing systems allow installations to divide the physical processing resources into multiple logical computer systems. Methods have been developed to control the resource consumption of these logical computer systems thus enabling an installation to obtain a cost control mechanism for their infrastructure. In order to expand these technologies a method is proposed to control the capacity usage of multiple logical computer systems sharing the same physical computer. The new methodology allows installations to group multiple logical computing systems together and balance their capacity until an overall capacity limit is reached. The new method extends an existing technology which allows an installation to control the capacity usage of a single logical computer system.

The invention proposes a mechanism to control the capacity usage of multiple logical computer systems of a physical computer environment which are grouped together. The invention extends an existing method which gives the end user control over the capacity usage and thus the cost for a single logical computer system. The new method makes more efficient use of the computer resources and thus enables for better and more efficient cost control in large information technology centers. The proposed solution consists of the following aspects:

1. Definition of groups of logical computer systems for capacity and cost management on physical computer environments.
2. Management of the group of logical systems towards a common a capacity limit.
3. The solution is based on an existing method to control the capacity usage of a single logical computer system.

4. The solution discusses alternatives how the capacity can be balanced between the logical computer systems for maximum effectiveness.

Figure 1:
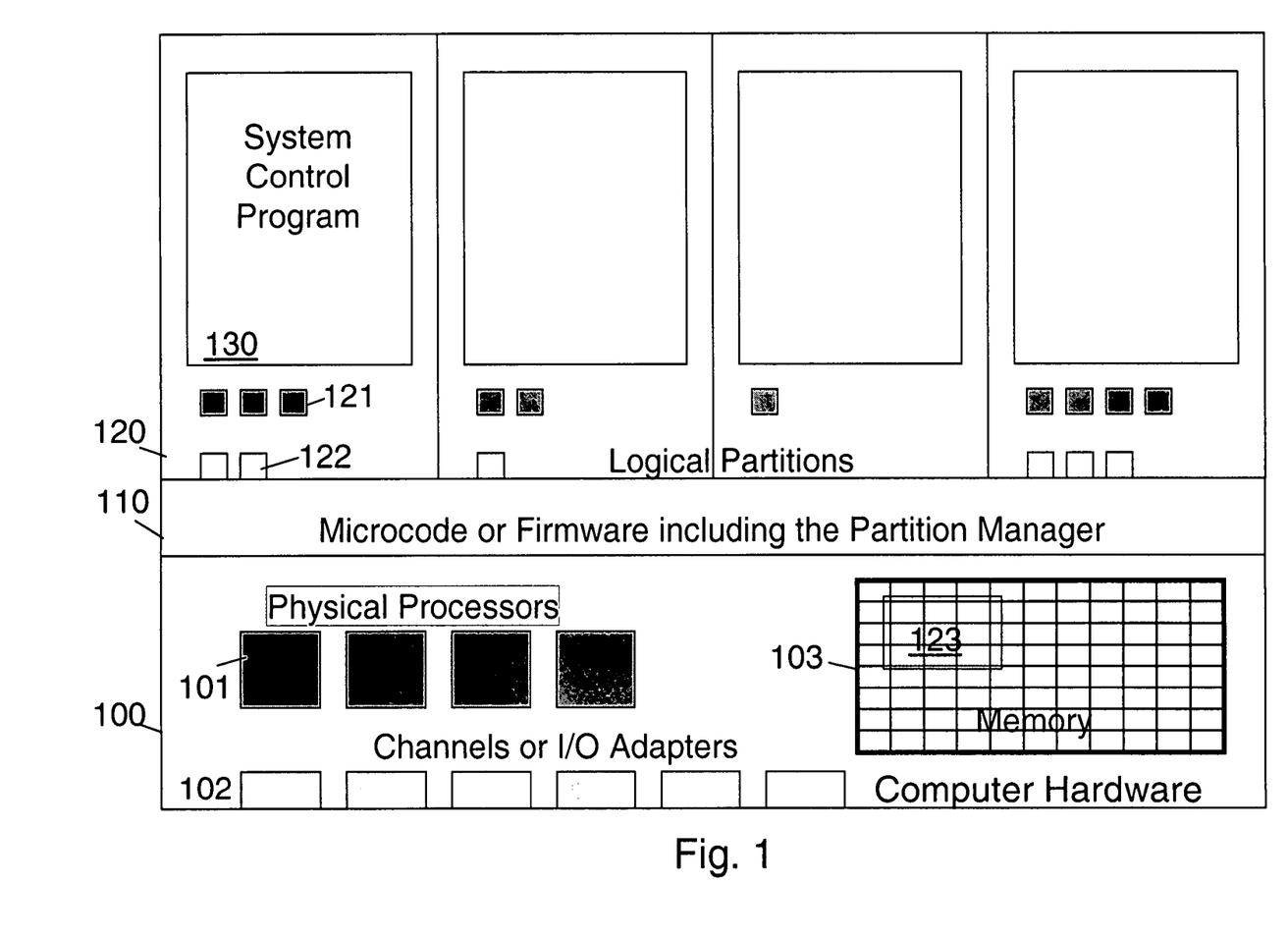
FIG. 1 illustrates the components of a modem computing environment.

FIG. 1 illustrates the components of a modern computing environment. The computer hardware can be roughly divided into three components: physical processors 101 which execute the program instructions; I/O adapters or channels 102 to connect external devices such as direct access storage devices or tape devices; memory 103 to keep the program instructions and results. In order to execute programs on the computer hardware it is necessary to execute an operating system on it. The base for the operating system is the microcode or firmware 110 which allows the operating system to access the physical resources. Modern computing environments allow executing multiple different operating systems at the same time. In order to do this the microcode is accompanied by a partition manager which allows creating multiple logical partitions 120 or logical computing systems on top of the physical computing resources. A logical partition gets a certain number of logical and physical computing resources assigned. Usually each partition has its own logical processors 121 and logical I/O adapters or logical channels 122. The partition manager is responsible for mapping these logical resources to the physical resources in order to execute user programs. In addition the logical partitions get a fixed amount of physical memory 123 assigned to store the programs for execution. In order to execute application programs a system control program 130 or operating system is started in the logical partition. In general a partition manager supports multiple different system control programs meaning that different logical partitions can execute different operating systems at the same time.

Figure 2:
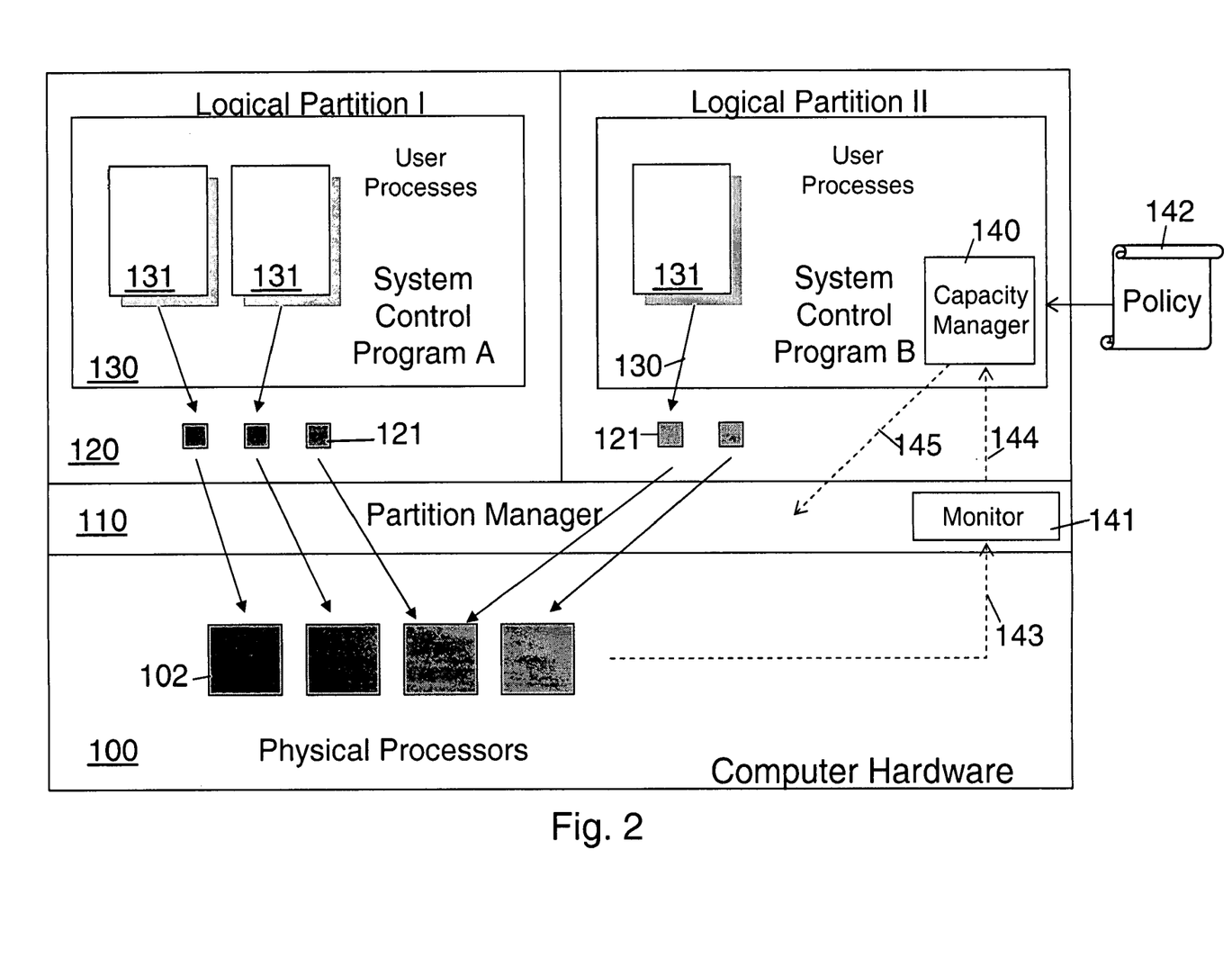
FIG. 2 shows the relevant components for capacity management.

FIG. 2 shows the relevant components for capacity management. Capacity management in this context is always related to CPU capacity management. In a computer environment CPU capacity management consists of functions which map user programs or user processes 131 to logical processors 121. This is the primary task of the system control program 130 or operating system. For a logical computer which is established by executing a system control program 130 in a logical partition 120 another step is required which maps the logical processors 121 to the physical processors 101 when program instructions are executed. This is a function of the partition manager 110 which is part of the microcode or firmware of the computer hardware 100.

The CPU capacity of each logical partition is constantly monitored in order to allow a capacity manager 140 to control the consumption of a logical partition. The monitoring function 141 is part of the partition manager 110. The location of the capacity manager 140 can vary depending on the computing environment. In theory it is possible that it is a part of the partition manager 110. Another possibility is that it is a function of the system control program 130 or it could be a separate user process 131. In any case a policy 142 is required which defines how much CPU resources can be consumed by the logical partition 120. In this context the definition is always necessary that the capacity manager 140 understands the utilization and consumption of the physical computing resources. For this reason it obtains the actual measurement data 143 from the partition manager 144 and signals back to the partition manager 110 to what extent a logical partition is allowed to consume physical processor resources 145. The adjustment whether physical processing resources can be consumed by a logical partition 120 is executed by the partition manager 110 which either enables logical processors 121 to execute their program instructions on physical processors 102 or not.

The most practical approach where the capacity manager is hosted depends on the surrounding environment. In a real environment it is not separated from other management components which manage resource consumption and workloads on a computer environment. Such functions, as the z/OS Workload Manager, are part of the operating system or system control program and not part of the partition manager. Being part of the system control program enables these managers to measure and control the work running under the operating system as well as to communicate with the partition manager for influencing its operation. If a capacity manager is part of the partition manager it is narrowed to a specific function which requires additional cooperative functionality for effective deployment. The same is true when the management function is part of a user process because this needs access to the system control program and the partition manager which is difficult in a real environment. Therefore the most natural solution is to include it into the system control program.

Figure 3:
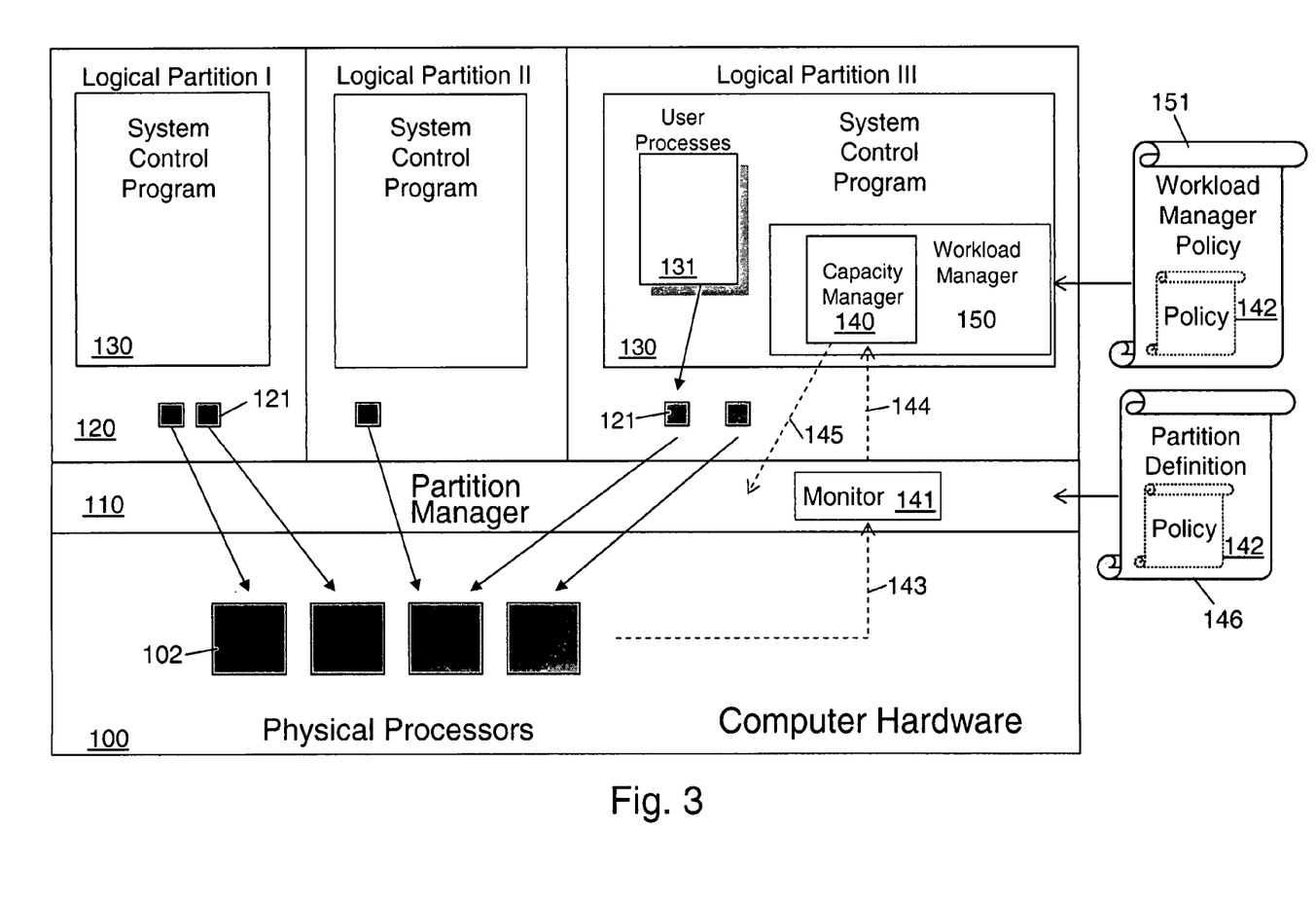
FIG. 3 shows the components of a computing environment which allows capacity management with the capacity manager being part of the system control program of a partition.

FIG. 3 shows the components of a computing environment which allows capacity management with the capacity manager being part of the system control program of a partition. The most important change of this picture related to FIG. 2 is that the policy 142 which is required to specify the rules for the capacity management now becomes part of an overall workload management policy 151 and part of the definitions for the logical partitions 146. The capacity management function 140 is now an integral part of the workload management function 150 of the operating system.

Figure 4:
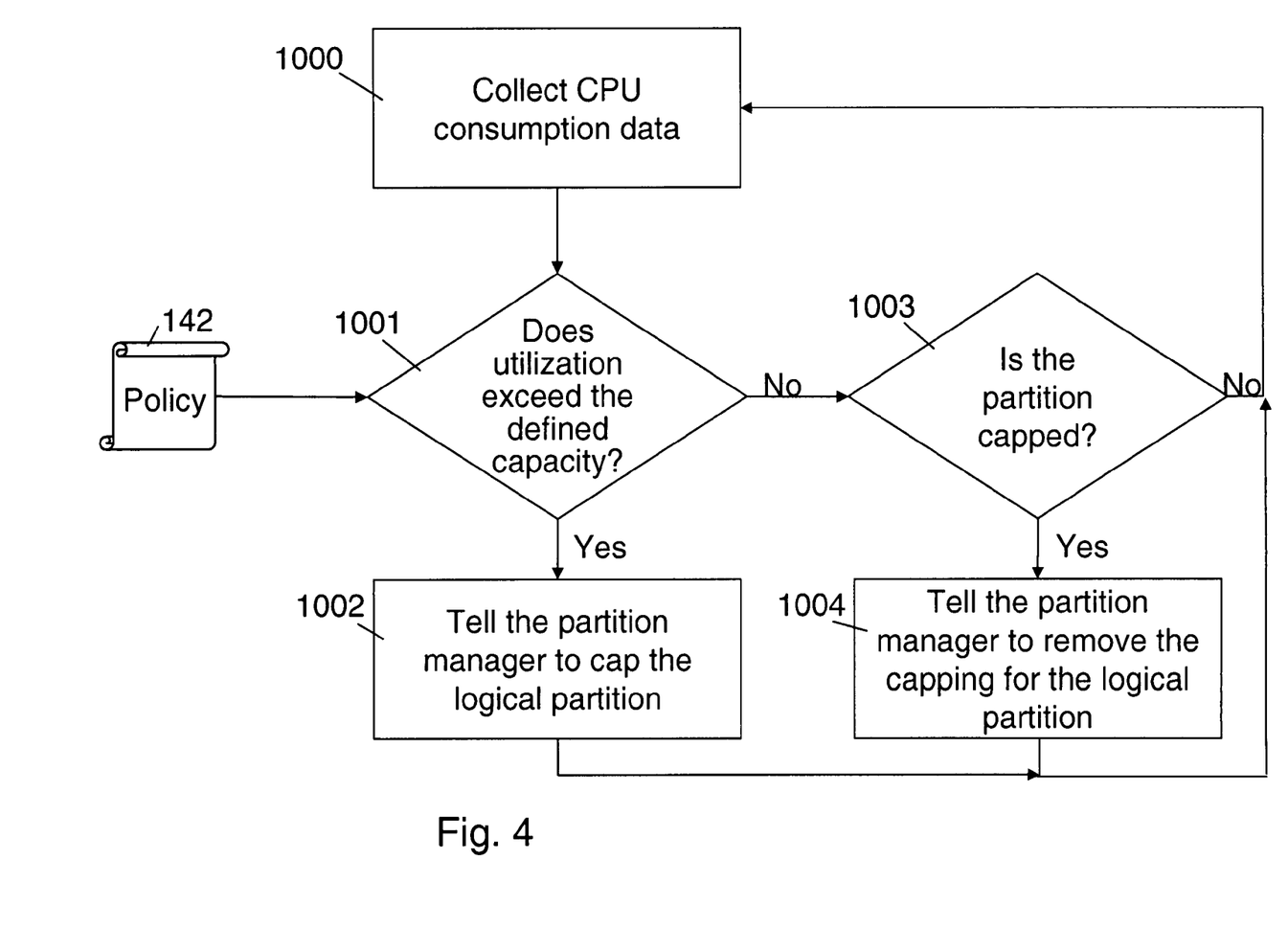
FIG. 4 depicts the general behavior of a capacity management function which controls and limits the amount of consumed CPU for a logical partition.

FIG. 4 depicts the general behavior of a capacity management function which controls and limits the amount of consumed CPU for a logical partition. This function allows controlling the CPU consumption of single logical partitions of a computing environment. If multiple logical partitions use this function they are all controlled individually not coordinated with each other. The policy 142 defines the amount of CPU the logical partition is allowed to consume from the physical CPU resources. The capacity manager continuously collects the CPU consumption 1000 for its logical partition from the partition manager. It is possibly and practical to view the CPU consumption over a well defined time period. For example a multi hour time period can be used as a base for the CPU resources being consumed by the logical partition. This allows the work running in the partition to consume more CPU for a short time period until the defined capacity limit has been reached over the defined period. The collection of the data and the calculation of the multi hour time average 1000 can then be performed in smaller time units. As an example the average could be calculated over a 4 hour period and the data collection and update of the average utilization every 5 minutes. After updating the multi hour time average the mechanism compares the average 1001 against the defined capacity limit from the policy definition 142. If it exceeds the limit the capacity manager tells the partition manager to reduce the time period the logical processors for this logical partition are allowed to be dispatched on the physical processor resources 1002. There are multiple possibilities how this can be achieved. If the limit is not exceeded the capacity manager checks whether the logical partition is currently be capped 1003. If the multi hour time average is now below the defined capacity limit 1003, the capacity manager tells the partition manager to remove the capping of the logical partition 1004. After that the partition manager will collect the next CPU consumption data and performs the next set of calculations.

What is missing in this example? Currently it is only possible to limit the CPU consumption of a single logical partition. If an installation uses the technique to limit the consumption of multiple partitions running on the same physical computer environment they can only control the CPU consumption for each logical partition individually. The disadvantage is that one logical partition might get capped because it exceeds its defined capacity limit while other logical partitions do not use their defined capacity. This can cause limitations to the work running on the capped partition while other partitions have plenty of unused capacity. The principal item of the invention is to combine the capacity management of multiple partitions allowing a group of logical partitions being managed towards a common capacity limit.

Figure 5:
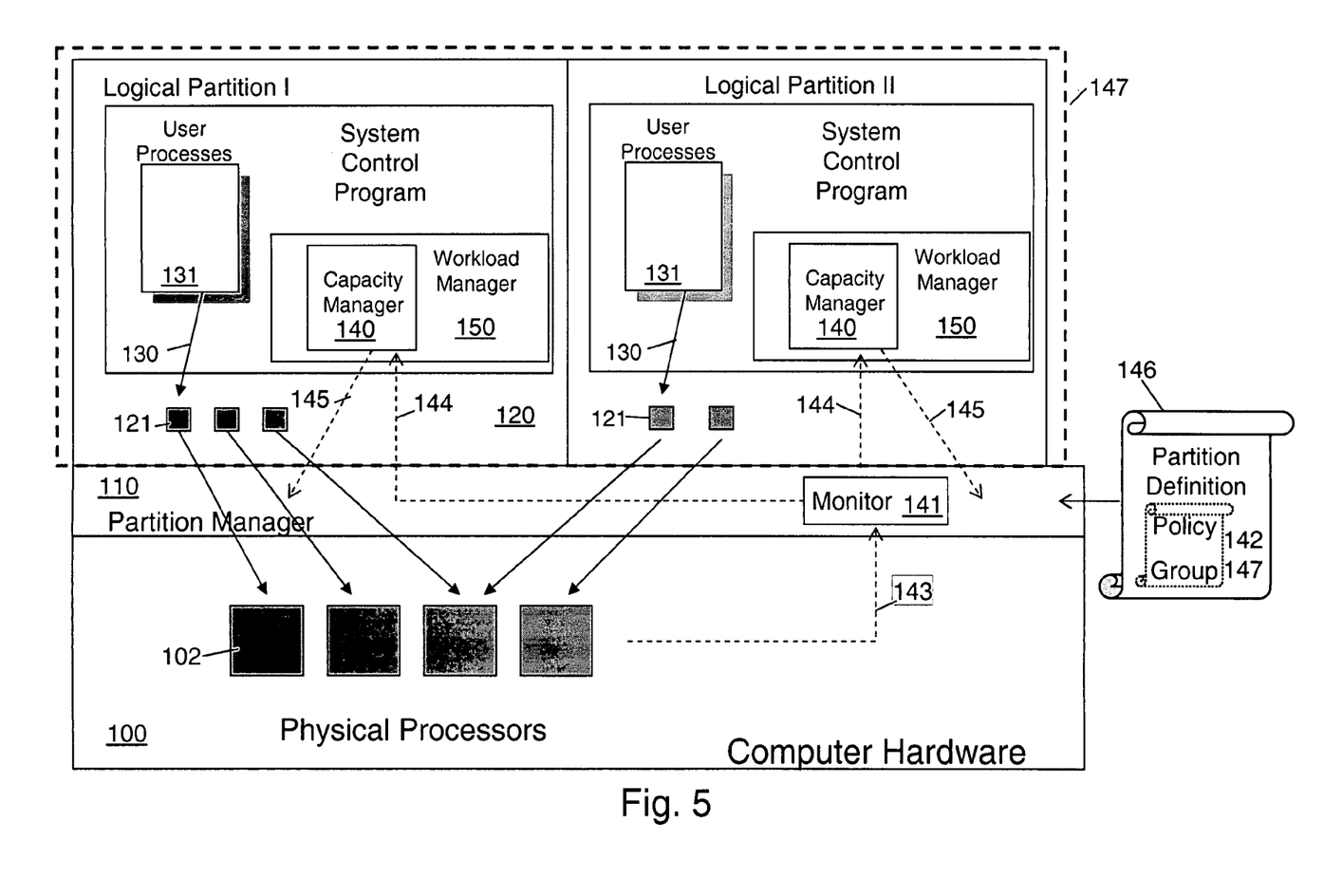
FIG. 5 shows the main change for managing a group of logical partitions from FIG. 3 which only allows managing single logical partitions.

FIG. 5 shows the main change for managing a group of logical partitions from FIG. 3 which only allows managing single logical partitions. The partition definition now also contains a group name 147 which identifies logical partitions belonging to the same group. All other components remain the same; the capacity manager 140 in this example is still part of the workload management function 150 of the system control program 130. Also all capacity managers 140 function independently of each other meaning that there is no necessity to communicate with each other for the reason of capacity management. The only communication takes place between the partition manager 110 and the capacity managers 140. Nevertheless the mechanism to control the capacity of each logical partition must change. It should also be noted that it might be possible to define more than one group of logical partitions for the purpose of capacity management on each computing environment. Because each logical partition acts independently from all others it automatically identifies itself as being part of a certain group or not. The group definition 147 becomes part of the partition definition 146 and is passed to each logical partition by the partition manager.

It is also possible as previously discussed that the capacity manager is part of the partition manager or part of a user process. Both variations are discussed at a later point in the description. Another possibility is to manage the CPU capacity across the logical partitions of multiple physical systems. This will be discussed at the end as well.

Figure 6A:
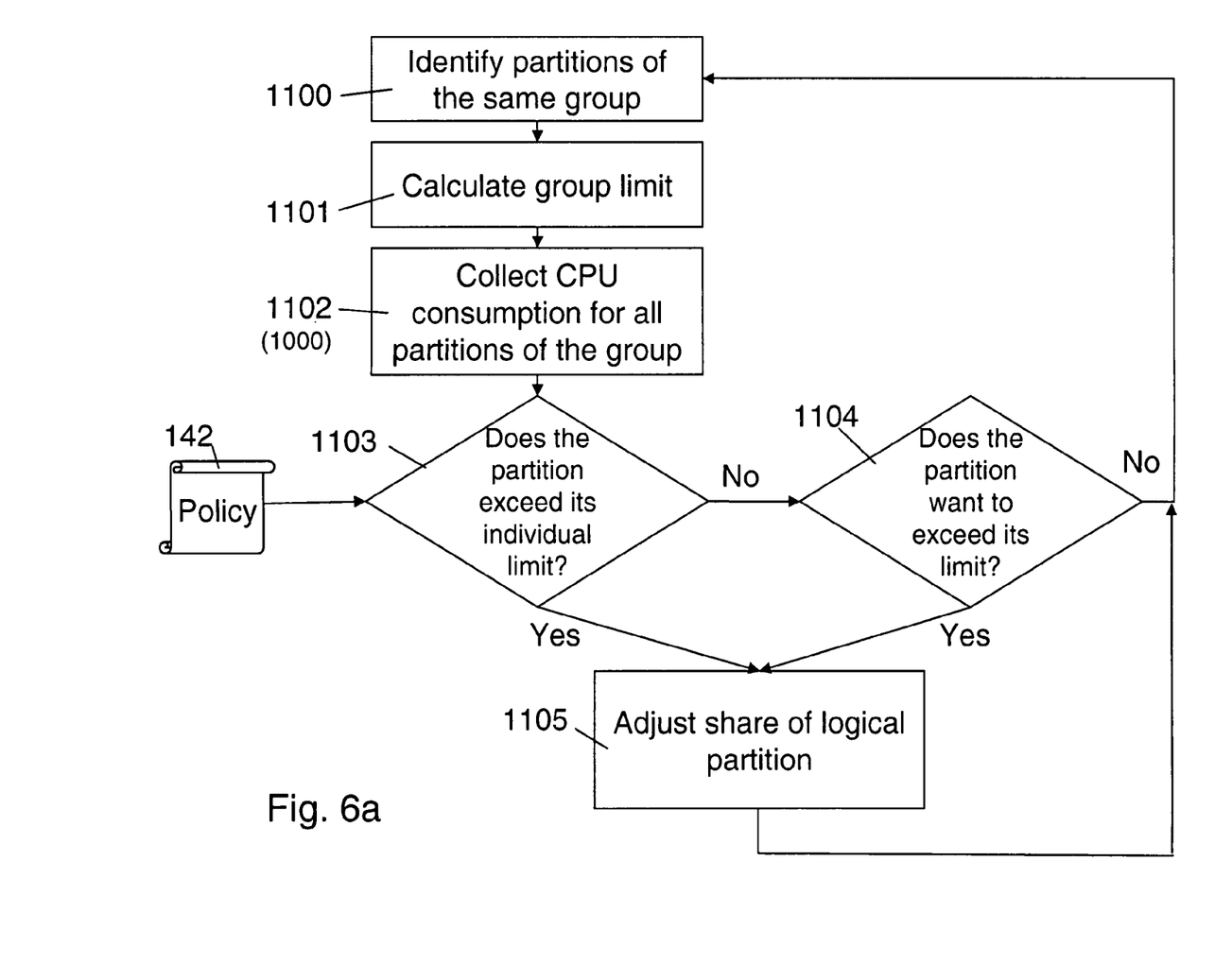
FIGS. 6a and 6b show the mechanism to control the CPU capacity for a logical partition which is part of a partition group.
Figure 6B:
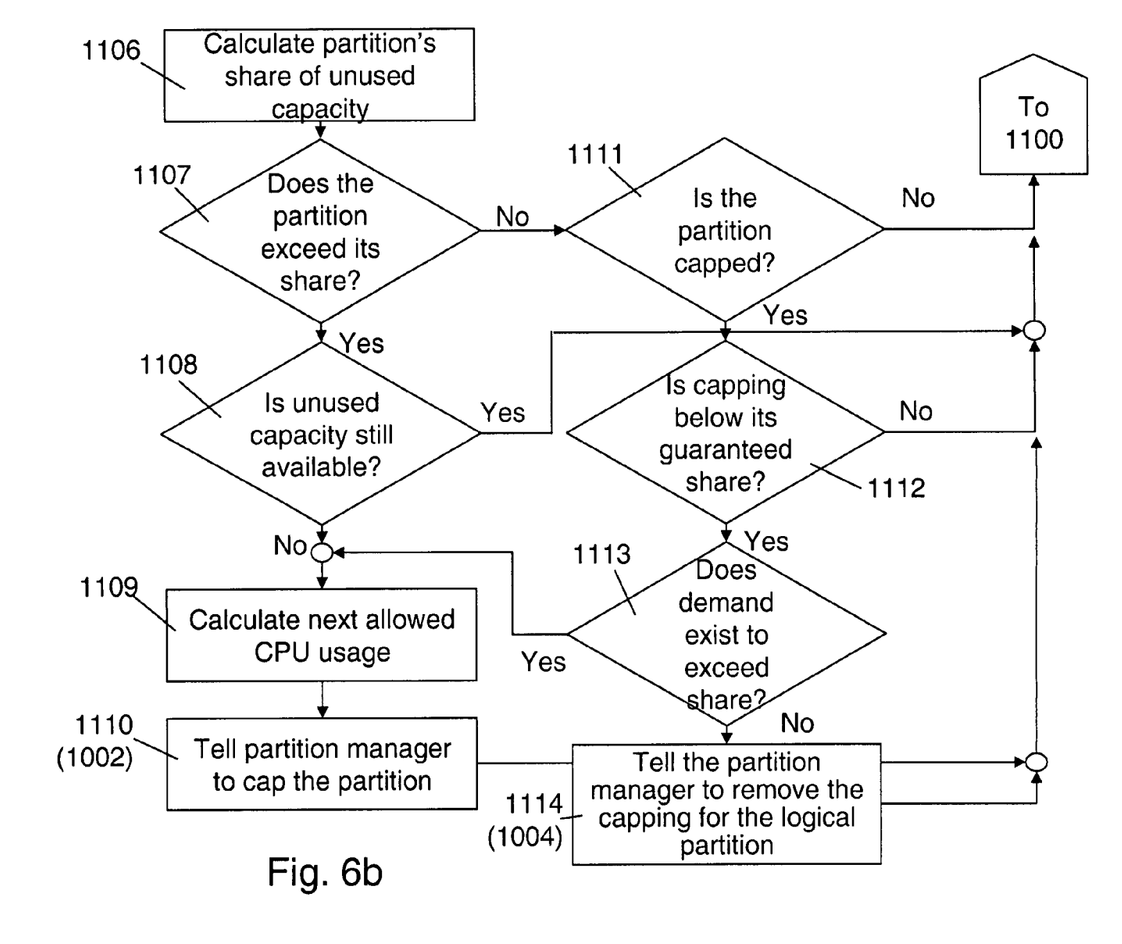

FIGS. 6a and 6b show the mechanism to control the CPU capacity for a logical partition which is part of a partition group. The data collection and calculations are performed by the capacity managers that are part of the system control program in each partition. The following description uses the terminology of CPU capacity. How this is measured and defined depends on the computer architecture. The first step of the iteration is to identify the partitions which are part of the same group 1100. This information is obtained from the partition manager. After all partitions of the group have been identified the capacity group limit is calculated as the sum of the individual capacity limits 1101. The individual capacity limit is named soft cap in the following formula:

$$\text{Capacity Group Limit} = \sum_{i=1}^{All\ Partitions\ in\ the\ Group} \text{Soft Cap for Partition}(i)$$

As a variance it is also possible to define the group capacity limit as a separate value for all logical partitions forming the group. A group is defined as a group name and a group capacity limit. The individual limit for each partition, which is required to define the points where each individual logical partition gets capped and also to define how much CPU consumption each logical partition is allowed to consume, is defined by the weight of the logical partition of the physical processor or system.

Each logical partition now has target capacity usage:

$$\text{Target Cap Usage} = \text{Group Limit} \cdot \frac{\text{Partition Weight}}{\sum_{i=1}^{All\ partitions\ of\ the\ Group} \text{Partition Weight}(i)}$$

The target capacity usage may be different from a guaranteed capacity usage because partitions outside the group may prevent a partition to achieve the target usage. A guaranteed usage is defined by:

$$\text{Group Share} = \frac{\sum_{i=1}^{All\ partitions\ of\ the\ Group} \text{Partition Weight}(i)}{\sum_{i=1}^{All\ partitions\ of\ the\ CEC} \text{Partition Weight}(i)}$$

Guaranteed Partition Share = MIN $$(\text{Group Limit, Group Share}) \cdot \frac{\text{Partition Weight}}{\sum_{i=1}^{All\ partitions\ of\ the\ Group} \text{Partition Weight}(i)}$$

The target capacity usage now functions as the individual capacity limit of the original proposal meaning it defines the point up to which each partition is allowed to consume capacity without ever being capped.

In addition this implementation provides the ability to combine both a group capacity limit and an individual capacity limit for a partition therefore providing the ability to control the CPU consumption for work from different points of view. The group capacity limit is able to allow for borrowing unused CPU from other partitions of the same group while the individual limit allows to protect costs for certain application which can't completely use all unused capacity.

The next step is to collect the consumed capacity of all partitions in the same group 1102. This is basically the same function as described in FIG. 4 step 1000. The difference is now that the data is obtained for all partitions in the group.

Figure 7:
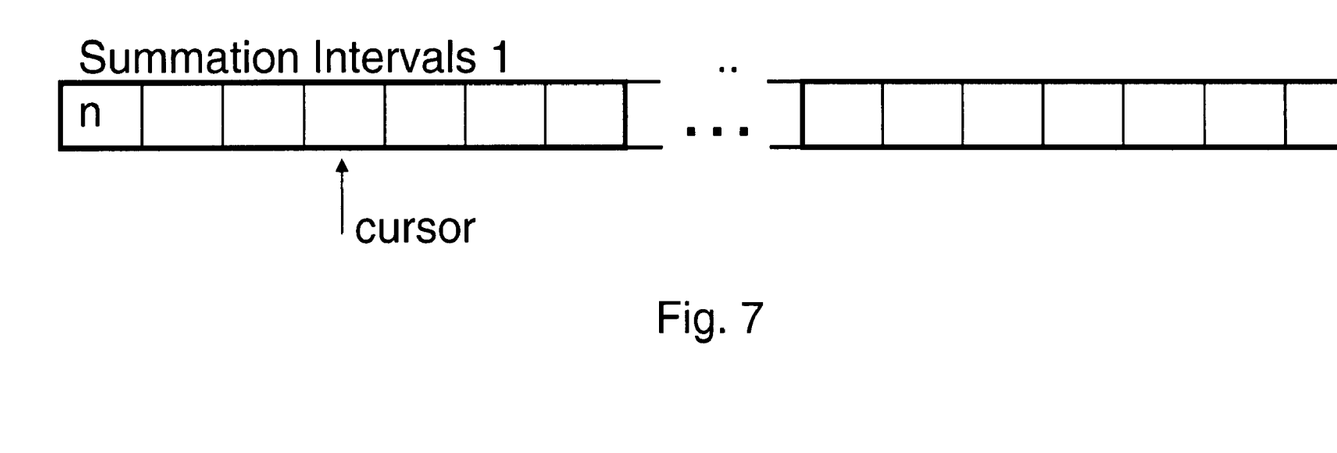
FIG. 7 shows different summation intervals.

The data in each step is the average CPU consumption for the time of the two invocations of the mechanism. This interval is named a summation interval, see FIG. 7. The average consumed CPU capacity which is used to determine whether the capacity limit is exceeded is the average consumption over all summation intervals. For each step the actual data is written to the interval identified by the cursor which is moved to the next interval when the operation completes. By this the oldest interval is always overwritten with the newest data. When the cursor is at the last interval of the array it is moved to the first interval afterwards.

After the data has been collected the capacity manager checks whether its partition exceeds its individual defined capacity limit 1103. If not it then checks whether it can be expected that the partition will exceed its individual capacity limit 1104. If any of these two decision points show a true result the capacity manager starts to evaluate how the logical partition's share of the available unused capacity can be adjusted 1105. Otherwise the capacity manager waits until the next data evaluation period. The calculation whether the partition will potentially exceed its individual capacity limit is calculated by assessing the change of CPU consumption and adding this change to the latest collected CPU consumption.

FIG. 6b describes the necessary steps to evaluate how much the partition is allowed to exceed its individual capacity limit and to what extent it must be capped. In the first step the capacity manager calculates the partition's share of the unused capacity 1106:

$$TotUnusedCap = \sum_{i}^{All\ partitions\ in\ the\ Group} \text{Max}(0, SoftCap(i) - CurCapConsumption(i))$$

$$ShareOfUnCap(i) = \frac{SoftCap(i)}{\sum_{k}^{All\ Partitions\ exceeding\ their\ Softcap} Softcap(k)}$$

$$AllowedCap(i) = SoftCap(i) +$$
$$\text{Max}(0, (TotUnusedCap - MaxIncrease) * ShareOfUnCap(i)) \text{ with } i,$$

$$k = \text{index for partitions in the capacity group}$$

The total unused capacity (TotUnusedCap) is the sum of the CPU capacity to which a partition is entitled to but which is not used by the partition. For partitions which exceed their current capacity limit this value is set to zero. The next step is to calculate the share of the unused capacity for all partitions which exceed their individual capacity and which have been assessed to exceed their individual limits. The individual capacity limits are named SoftCap. Now it is possible to calculate the CPU capacity which each partition which needs more capacity is entitled to get from the unused capacity. MaxIncrease is the maximum increase in capacity for all partitions during a summation interval. It is independent from the partitions and depends only on the CEC capacity and the number of summation intervals:

$$MaxIncrease = \frac{CEC\ Capacity}{NumberOfSummationIntervals}$$

The next decision is to ask whether the partition exceeds its entitled share of the unused capacity or whether it can be expected that it will exceed the share in the next interval 1107. If yes the next question is whether unused capacity is available or whether the unused capacity is used by partitions exceeding their individual capacity limits or whether it can be expected that the unused capacity will be used in the next interval 1108. If it can be concluded that unused capacity is still available there is no need to limit the CPU consumption for the partition. Otherwise the next allowed CPU consumption is calculated 1109:

$$DeltaCapConsumpt(i) = CurCapConsumpt(i) - LastCapConsumpt(i)$$

$CurCapConsumpt(i) = CPU$ capacity consumption of partition $i$ for current summation interval $LastCapConsumpt(i) = CPU$ capacity consumption of partition $i$ for last summation interval $$NextCapConsumpt(i) = \begin{cases} \text{More if } DeltaCapCosumpt(i) > 0 \\ \text{Same if } DeltaCapCosumpt(i) = 0 \\ \text{Less if } DeltaCapCosumpt(i) < 0 \end{cases}$$

The NextCapConsumpt determines the factor by which the capacity manager tells the partition manager to cap or restrict the partition's CPU consumption 1110. This is basically the same function as described in FIG. 4 1002 with the difference that in the previous model the partition was always capped at the defined capacity limit while it can now exceed the limit and can be capped above it.

If it is concluded in step 1107 that the partition does not exceed its share it is checked whether the partition is currently capped 1111. If yes the next decision is to find out whether the partition is capped below its share 1112. If that's the case it is necessary to evaluate whether it can be expected whether the partition will exceed it share in the next iteration 1113. If yes the same adjustments as described in step 1109 will be performed. If not the capping is removed 1114. After completing the adjustment the next iteration starts again with step 1100.

The first alternative is discussed above: It assumes that the capacity manager is part of the system control program. The capacity manager performs all assessments and only tells the partition manager whether and how the partition it is running must be capped, meaning be restricted in using the CPU.

The next alternative is that the capacity manager runs as part of a user process and is not integrated in the system control program. The basic behavior remains exactly the same with the only difference that it must be assured that the user process is able to access the partition manager in the same way as the system control program. Also if the system control program contains a workload management function the capacity manager is completely detached from this function.

The third alternative is that the capacity manager is part of the partition manager. Again the mechanism described in FIGS. 6a and 6b still remains the same with the exception that the capacity manager in the partition manager now performs the calculation for all partitions in a group at once. The basic notion remains the same.

The approach can be extended to work across multiple physical computing environments. The following must be guaranteed:

1. The approach assumes that CPU consumption has the same meaning on different physical computing environments. This assumption can be guaranteed for computing environments of the same system architecture.
2. The logical partitions must be able to communicate with each other or the partition manager must be able to communicate with each other. This is necessary to obtain the CPU consumption of the partition running on the remote physical computing systems.

If these assumptions are guaranteed the basic mechanism remains the same. Exceeding the individual limit is now possible as long as capacity is available on the local physical system. Also the maximum increase for all partitions must include the capacity of all computing environments on which partitions of the same group are executed.

What is claimed is:

1. A method for controlling capacity usage in a logically partitioned data processing system comprising physical data processing resources that are divided into multiple logical partitions, each of which has logical data processing resources that are mapped by a partition manager to said physical data processing resources and is capable of executing a different operating system, wherein usage of said physical data processing resources by said logical partitions is monitored to control consumption of said physical data processing resources, said method comprising the steps of:

defining at least one group of said logical partitions that is managed towards a group capacity limit;

collecting data on consumption of said physical data processing resources by the logical partitions in said at least one group;

determining from said data whether the consumption of said physical data processing resources by a logical partition in the at least one group exceeds an individual capacity limit defined for that logical partition; and responsive to the consumption of said resources by said logical partition exceeding said individual capacity limit, assigning to the logical partition a share of the group capacity limit that is not being used by other logical partitions in said at least one group, even if another logical partition in the at least one group has not reached an individual capacity limit defined for that other logical partition, wherein the share of the group capacity limit for the logical partition is increased as a function of a total unused capacity for the at least one group and a share of the unused capacity for the logical partitions in the at least one group exceeding their individual capacity limits.

2. A method according to claim 1, wherein the group capacity limit is defined as a sum of the individual capacity limits of the logical partitions forming the at least one group.

3. A method according to claim 1, wherein the group capacity limit is defined as a separate value for the logical partitions forming the at least one group.

4. A method according to claim 1, wherein said determining step comprises the steps of:

determining whether said consumption is currently exceeding said individual capacity limit; and responsive to the consumption not currently exceeding said individual capacity limit, determining whether said consumption will potentially exceed said individual capacity limit.

5. A method according to claim 4, wherein the step of determining whether said consumption will potentially exceed said individual capacity limit comprises the steps of:

assessing a change in consumption; and adding the assessed change in consumption to a latest determined consumption.

6. A method according to claim 1, further comprising the step of:

evaluating how a logical partition's share of available unused capacity can be adjusted if the logical partition is exceeding its individual capacity limit.

7. A method according to claim 6, wherein said evaluating step comprises the step of:

calculating the logical partition's share of the unused capacity.

8. A method according to claim 7, wherein said evaluating step further comprises the step of:

calculating the total unused capacity for all logical partitions of the at least one group as a sum of capacities to which the logical partitions of the at least one group are entitled but which are not used by the logical partitions.

9. A method according to claim 8, wherein said evaluating step further comprises the step of:

calculating the share of the unused capacity for all logical partitions which exceed their individual capacity and which have been assessed to exceed their individual limits.

10. A method according to claim 9, wherein said evaluating step further comprises the step of:

calculating a maximum increase in capacity for the logical partitions of the at least one group during a summation interval.

11. A method according to claim 10, wherein said evaluating step further comprises the step of:

determining whether the logical partition exceeds its entitled share of the unused capacity or can be expected to exceed the share in the next interval.

12. A method according to claim 1, wherein said physical data processing resources comprise CPU resources.

13. A computer program product stored on a tangible medium readable by a digital computer, containing software code for executing a method, for controlling capacity usage in a logically partitioned data processing system comprising physical data processing resources that are divided into multiple logical partitions, each of which has logical data processing resources that are mapped by a partition manager to said physical data processing resources and is capable of executing a different operating system, wherein usage of said physical data processing resources by said logical partitions is monitored to control consumption of said physical data processing resources, said method comprising the steps of:

defining at least one group of said logical partitions that is managed towards a group capacity limit;

collecting data on consumption of said physical data processing resources by the logical partitions in said at least one group;

determining from said data whether the consumption of said physical data processing resources by a logical partition in the at least one group exceeds an individual capacity limit defined for that logical partition; and responsive to the consumption of said resources by said logical partition exceeding said individual capacity limit, assigning to the logical partition a share of the group capacity limit that is not being used by other logical partitions in said at least one group, even if another logical partition in the at least one group has not reached an individual capacity limit defined for that other logical partition, wherein the share of the group capacity limit for the logical partition is increased as a function of a total unused capacity for the at least one group and a share of the unused capacity for the logical partitions in the at least one group exceeding their individual capacity limits.

14. A system for controlling capacity usage in a logically partitioned data processing system comprising physical data processing resources that are divided into multiple logical partitions, each of which has logical data processing resources that are mapped by a partition manager to said physical data processing resources and is capable of executing a different operating system, wherein usage of said physical data processing resources by said logical partitions is monitored to control consumption of said physical data processing resources, said system comprising:

means for defining at least one group of said logical partitions that is managed towards a group capacity limit;

means for collecting data on consumption of said physical data processing resources by the logical partitions in said at least one group;

means for determining from said data whether the consumption of said physical data processing resources by a logical partition in the at least one group exceeds an individual capacity limit defined for that logical partition; and means responsive to the consumption of said resources by said logical partition exceeding said individual capacity limit for assigning to the logical partition a share of the group capacity limit that is not being used by other logical partitions in said group, even if another logical partition in the group has not reached an individual capacity limit defined for that other logical partition, wherein tile share of the group capacity limit for the logical partition is increased as a function of a total unused capacity for the at least one group and a share of the unused capacity for logical partitions in the at least one group exceeding their individual capacity limits.

* * * * *